United States Patent [19]
D'Antonio et al.

[11] 3,992,948
[45] Nov. 23, 1976

[54] DIVER INFORMATION SYSTEM

[76] Inventors: Nicholas F. D'Antonio, 7695 Admiral Drive, Liverpool, N.Y. 13088; Richard L. Bates, 125 Hillside Way, Camillus, N.Y. 13031

[22] Filed: Sept. 27, 1974

[21] Appl. No.: 509,924

[52] U.S. Cl. ............................... 73/432 R; 235/184
[51] Int. Cl.² ................... G06G 7/60; G01L 13/00
[58] Field of Search ........... 73/300, 432 R, 432 CR; 128/2.1 R, 204; 235/150.5, 184, 185; 328/132

[56] References Cited
UNITED STATES PATENTS

| | | | |
|---|---|---|---|
| 3,457,393 | 7/1969 | Stubbs et al. | 235/184 |
| 3,649,871 | 3/1972 | Klein et al. | 324/162 X |
| 3,679,894 | 7/1972 | Smith | 324/162 X |
| 3,681,585 | 8/1972 | Todd | 235/184 |
| 3,711,779 | 1/1973 | Allington | 328/132 X |
| 3,726,138 | 4/1973 | Kosakowski et al. | 73/179 |
| 3,746,850 | 7/1973 | Moore et al. | 235/184 |
| 3,753,133 | 8/1973 | Shumate, Jr. | 328/132 X |
| 3,790,855 | 2/1974 | Hillman, Jr. | 324/162 UX |

FOREIGN PATENTS OR APPLICATIONS

351,225  2/1961  Switzerland .................... 73/291

*Primary Examiner*—Richard C. Queisser
*Assistant Examiner*—John S. Appleman
*Attorney, Agent, or Firm*—D. Peter Hochberg

[57] ABSTRACT

A system for providing information to a scuba diver relating to his position and movement in a body of water, including electronic circuitry for generating electrical signals reflective of the pressure over a period of time, and for comparing such signals with signals reflective of predetermined maximum rates of pressure change required for safe ascent. The system warns the diver when his rate of ascent exceeds the maximum allowable rate. The circuitry of the system generates additional signals for informing the diver of his direction of vertical movement, his down time, his depth, and the water temperature.

18 Claims, 10 Drawing Figures

DIVER INFORMATION SYSTEM

BACKGROUND OF THE INVENTION

1. Field of the Invention

The present invention relates to the control of the movement of a person through a fluid of variable pressure, and in particular to systems for enabling a diver to ascend through a body of water at safe rate which enables him to avoid undergoing decompression sickness. The invention further relates to information systems for providing a diver with data involving a dive.

2. Description of the Prior Art

Air is a mixture of many gases, and is generally composed of 78 percent nitrogen and 20 percent oxygen. Under normal atmospheric conditions, a person breathes in air at about 14.7 p.s.i. A portion of the inhaled air passes through the lung tissues into the blood, and the blood supplies the cells of the body with oxygen from the air. The blood in turn receives carbon dioxide from the cells and discharges this waste gas back through the lung tissues to be exhaled. When an air supply is to be provided to a person in an environment which has a pressure substantially higher than normal atmospheric pressure, such as to a diver in a body of water, the air must be supplied under pressure to offset the ambient pressure. The apparatus for supplying pressurized air to a diver is referred to as self-contained underwater breathing apparatus or scuba equipment. This equipment has made possible extended dives to great depths, but the use of scuba gear is potentially very hazardous. The excessive breathing of pressurized nitrogen can cause narcosis (a state of stupor), although the presence of dissolved nitrogen has not generally been found to be injurious to the body tissues. However, should such dissolved gases be released from solution at some location where the gas cannot be discharged from the body through the lungs, decompression sickness or the bends occurs.

If the ambient pressure of a person decreases, such as during the ascent of a diver, inert (e.g. nitrogen) gases previously dissolved in the blood and other body tissues tend to be released from solution. If the body is able to discharge the body occurs. If the body is not able to discharge the nitrogen gas which has been released from solution, nitrogen bubbles form as a result of the supersaturated condition of the tissues in which they are located. These bubbles travel with the blood stream and, should they lodge in the heart or brain, can cause death or paralysis. It is therefore crucial that the body have sufficient time to discharge through he lungs any gases so released. The foregoing normally only aplies to the nitrogen from the air which has been inhaled, since oxygen in the blood passes to the body cells rather than remaining in the blood.

The dangers associated with ascents through a body of water are well known. More specifically, the importance of ascending according to a schedule which enables the discharge of nitrogen gas from the body is basic knowledge to the experienced diver. Such a schedule assures an ascent slow enough to avoid the release of nitrogen bubbles in the blood stream, and can call for various decompression stops in the course of the ascent to effect the necessary discharge of nitrogen through the lungs as the ambient pressure is reduced. The United States Navy developed and published the standard Decompression Tables, which set forth the depth and duration of decompression stops required to avoid decompression sickness according to the depth and duration of a person's dive. These tables are a basic tool of divers and are based upon an ascent rate of 60 feet per minute. Adherence to this ascent rate is essential if an ascent is to be made according to the U.S. Navy Decompression Tables.

Divers following an ascent schedule of the foregoing tables must carry with them during a dive a depth gauge and a watch, and they must carefully compute their ascent rate to maintain the 60 feet per minute ascent rate, in addition to making the prescribed decompression stops. The ascent rate computation is difficult to make and is often unreliable, and divers conventionally attempt to approximate the proper ascent rate by ascending at the same rate as their exhaled bubbles rise towards the surface. These efforts have been seriously deficient because the bubble ascent rate is difficult to discern, especially at greater depths wher it is most important. Furthermore, the diver may become disoriented in his ascent, and could ascend in a non-vertical directin or could even descend. The foregoing problems are increased as the diver's air supply becomes low, and he must rise quickly.

There have been attempts to develop alternatives to the U.S. Navy Decompression Tables. For example, systems have been proposed for simultating the flow of nitrogen through the body tissues of a diver to indicate to the diver a safe ascent schedule. Indicative of such devices are those disclosed in the following U.S. Pat. Nos. 3,121,333, 3,710,625, 3,757,586, 3,759,108, 3,759,109, and 3,457,393. U.S. Pat. No. 3,681,585 discloses an analog computer for indicating a diver's decompression schedule, and incorporates a plurality of resistor-capacitor sets serially connected in an electrical cascading relationship. During the diver's ascent, the capacitors discharge in a manner such that the voltage remaining across the undischarged capacitors indicates the proper ascent schedule. Such devices have not been generally accepted because of their expense, bulk, and lack of reliability.

SUMMARY OF THE INVENTION

An object of the present invention is to control the rate at which a person reduces his ambient pressure to a rate which avoids decompression sickness. A more specific object is to enable a diver to control to a predetermined value his rate of ascent through a body of water.

Another object is to provide means for measuring values pertaining to a diver's movement through a body of water, and for converting such measurements to a readily usable form. More specifically, it is an object of the present invention to provide a device for making available to a scuba diver at least some of the following information: rate of ascent as compared to an established criteria, direction of vertical movement, depth, ambient temperature, and down time.

A further object is to provide a compact, effective and economical device for conveying the foregoing information to a diver.

Other objects will be apparent from the description to follow and from the appended claims.

The preceding objects are achieved according to the invention by the provision of a system for generating at a constant rate electrical signals corresponding to the instantaneous ambient pressure to indicate the actual rate of change of the ambient pressure, and for comparing these signals to a reference signal whose value is reflective of a predetermined rate of change of ambient pressure. In a preferred embodiment of the invention, a device adapted to be worn by a scuba diver includes a pressure transducer whose voltage output changes with pressure. At timed intervals controlled by a fixed frequency pulse generator, the voltage output of the transducer is fed to a differential amplifier. The differential amplifier in turn generates a voltage signal which serves as one input of a comparator for comparison with a reference voltage signal reflective of a predetermined rate of pressure change corresponding to a particular rate of ascent through the water (such as the 60 feet per minute rate upon which the U.S. Navy Decompression Tables are based). An indicator is triggered to generate a warning signal whenever the signal from the differential amplifier exceeds the reference voltage in the comparator, thus warning the diver to reduce his rate of ascent until the indicator is deactivated. The circuitry in the foregoing device can be adapted to additionally indicate to a diver the direction of vertical travel, the depth, the water temperature, and the downtime (duration of the dive). A digital readout display is provided for selectively indicating the various numerical values. A pressure switch responsive to the water pressure at a predetermined depth is provided for automatically activating the system, and a delay is incorporated for postponing the deactivation of the system for a period following ascent past the predetermined depth.

DESCRIPTION OF THE PREFERRED EMBODIMENTS

The embodiments of the invention described below provide electronic circuitry and associated elements arranged to indicate to a scuba diver accurate and readily understandable information relating to a dive in a body of water. The invention is particularly designed to indicate to the diver when his rate of ascent exceeds a predetermined rate to enable him to avoid decompression sickness. The predetermined rate can advantageously be the rate of 60 feet per minute upon which the U.S. Navy Decompression Tables are presupposed, whereby the diver can make optimal use of those tables a safe ascent. The invention provides means for generating electrical signals reflective of the actual water pressure at close, timed intervals, and for comparing sequential signals to obtain a signal reflective of the diver's actual rate of ascent. This indication of his actual ascent rate is compared to a signal reflective of the predetermined ascent rate, and if the actual rate exceeds the predetermined rate, an appropriate warning signal is generated. This system can also be used to compare the preceding signals relating to the diver's change of depth with a reference signal to indicate to the diver whether he is ascending or descending. The pressure signals can further be monitored to yield a depth reading. Pulses generated by the timing network used for establishing the foregoing timed intervals can be counted to measure the diver's downtime. The power source for the foregoing circuitry can be under the control of a pressure switch which actuates the power source only when the system is subjected to a pressure existing at a predetermined depth, to avoid the inadvertent and undesired depletion of the power source. The preceding information is advantageously conveyed to the diver on a digital readout display whereby the information displayed thereon can readily and accurately be comprehended by the diver.

Figure 1:
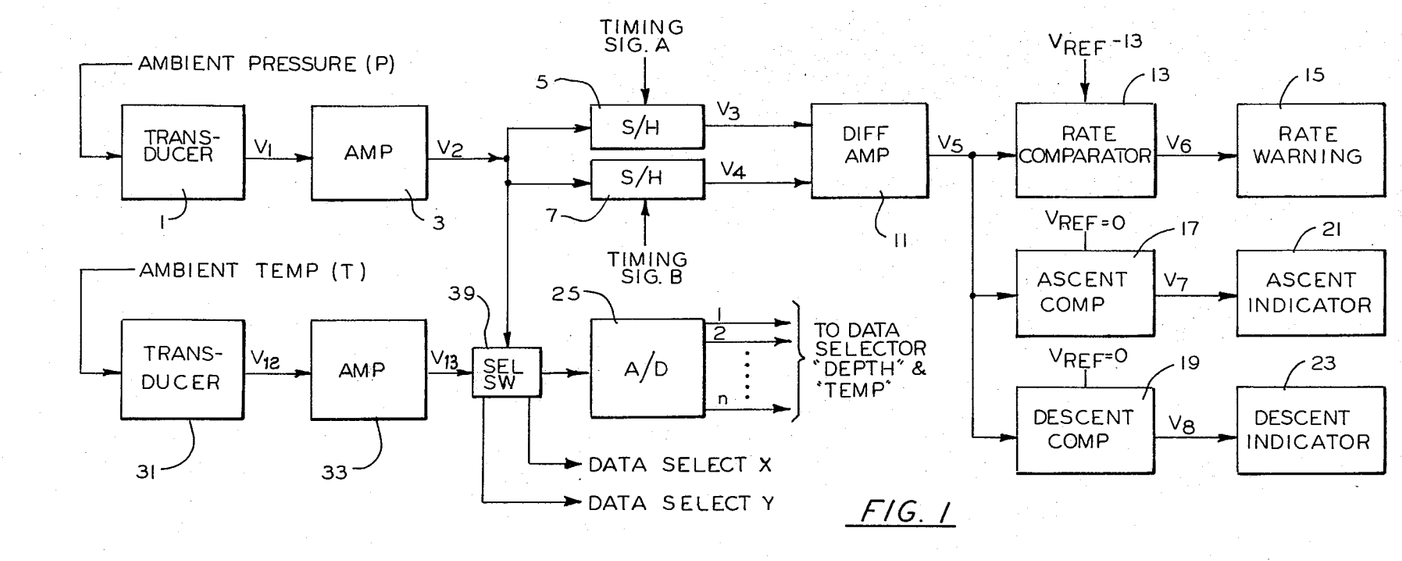
FIG. 1 is a block diagram of the system according to the invention for indicating information relating to a scuba diver's movement through a body of water.
Figure 2:
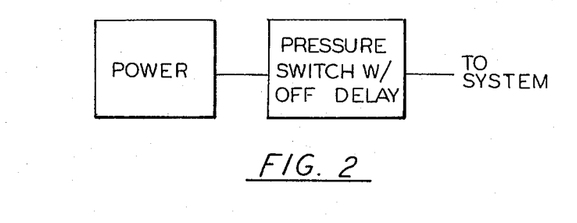
FIG. 2 is a block diagram of the power source for the system shown in FIG. 1.

Referring now to the block diagram shown in FIG. 1, there is depicted a basic system for warning the diver when his ascent rate exceeds a predetermined ascent rate of, for example, 60 feet per minute. In addition, the system shown in FIG. 1 includes other components for yielding additional related information. The basic system includes a pressure transducer 1 which can take any appropriate form for generating a voltage signal $V_1$, which is a function of the ambient pressure at any given instant. Voltage signal $V_1$ can be expressed as $V_1 = f[P(t)]$, where $P(t)$ is the instantaneous pressure. Such a voltage signal would normally be extremely weak, and a current or voltage amplifier 3 is therefore operatively connected to the transducer for amplifying the signal generated by the transducer. The output of the amplifier is designated as $V_2$ in the drawings, and is expressed by the relationship $V_2 = G_3 f[P(t)]$, where $G_3$ is the gain of the amplifier. A graphic representation of the voltage signal $V_2$ is shown by way of example in FIG. 9. The slope of the curve in FIG. 9 increases with an increasing rate of ascent, and may exceed a maximum predetermined value such as the slope corresponding to the previously mentioned 60 feet er minute as shown in the central portion of the curve.

Figure 3:
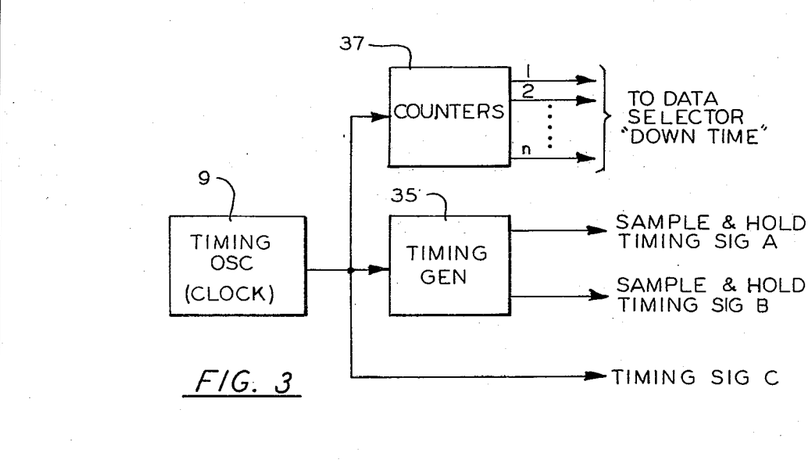
FIG. 3 is a block diagram of a timing network used in conjunction with the system shown in FIG. 1.
Figure 9:
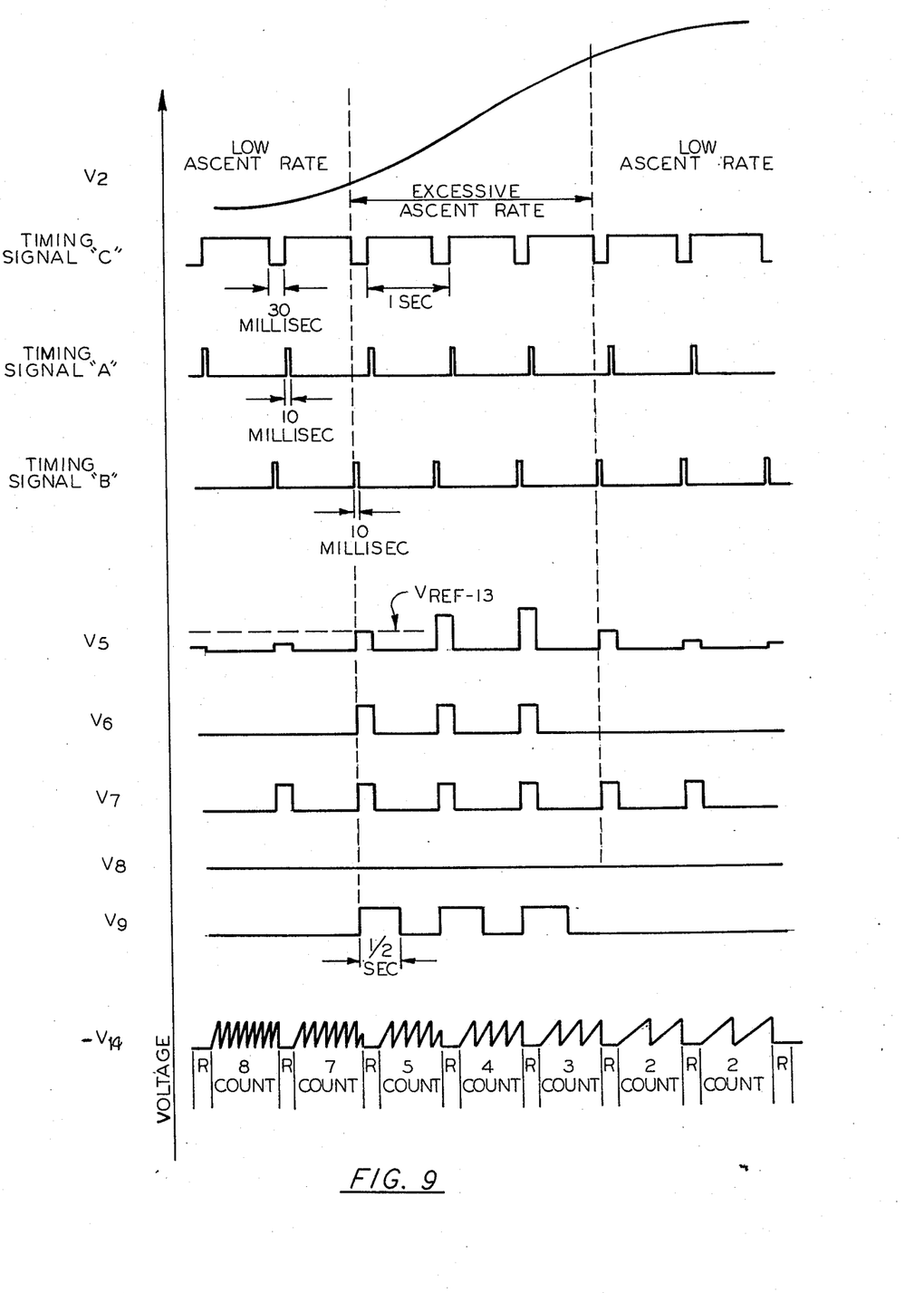
FIG. 9 is a graphic illustration of electrical signals which occur at various times and locations in the foregoing circuitry.

A pair of sample and hold devices 5 and 7 are operatively connected to amplifier 3 for receiving in alternating sequence the signal $V_2$ transmitted by the amplifier. These sample and hold evices are under the control of a timing oscillator 9 as shown in FIG. 3. The timing oscillator generates a regular succession of pulses which, as indicated by timing signal C in FIG. 9, are each composed of a negative edge and a positive edge (as determined considering the upper horizontal portion of the signal as the datum). Sample and hold device 5 is triggered upon the occurrence of a positive edge of a pulse of the timing oscillator, and at such time, device 5 "reads" and retains the instantaneous value of $V_2$, which is reflective of the pressure and hence the depth at that time. Sample and hold device 7 reads and retains the instantaneous value of $V_2$ in response to the negative edge of the next succeeding pulse of timing oscillator 9, the latter edge occurring at a predetermined period such as one second (less the pulse width) later than the last positive edge. Sample and hold devices 5 and 7 then generate voltage signals $V_3$ and $V_4$ respectively, which are proportionate to the ambient pressure at the subsequential istants of time at which the pressure responsive signals were determined. Signals $V_3$ and $V_4$ obey the respective relations $V_3 = G_3f[P(t_1)]$ and $V_4 = G_3f[P(t_2)]$ where $t_1$ and $t_2$ represent successive instants of time. The voltage signals $V_3$ and $V_4$ are then directed to a differential amplifier 11. The sequential determination of instantaneous pressures is repeated for so long as the entire system is energized and timing oscillator 9 is generating its pulses.

Differential amplifier 11 generates a voltage signal $V_5$ corresponding to the difference between the preceding sequential voltage signals of sample and hold devices 5 and 7 and amplifies this difference. Such amplification is necessary because the sampling period between the reading of the foregoing sequential signals should be very short to provide an accurate result, so that the signal indicative of the difference between signals $V_3$ and $V_4$ is very small. The output $V_5$ of differential amplifier 11 is a voltage which is a function of the change in pressure over the period of time between which the sequential pressure readings were taken, which has been arbitrarily selected as one second. The value of $V_5$ is therefore $V_5 = G_{11}(V_4 - V_3) = f[\Delta P(t)]$ where $G_{11}$ is the gain of differential amplifier 11, and $\Delta P(t)$ is the change of pressure over the predetermined time period.

The output signal $V_5$ of differential amplifier 11 is fed to a comparator 13 which serves as an excessive ascent rate comparator. Also fed to comparator 13 is a voltage signal $V_{REF-13}$ which is proportionate to, and reflective of, a predetermined rate of ascent which, as mentioned above, can be 60 feet per minute for use in conjunction with the U.S. Navy Decompression Tables. The latter comparator compares the actual rate of ascent as indicated by the voltage signal $V_5$ with the predetermined or reference value $V_{REF-13}$ and, if the former value exceeds the predetermined value, a voltage $V_6$ is generated. A warning device 15, such as a visual or audible alarm, is operatively connected to comparator 13 and is actuatable in response to the generation of the signal $V_6$. Hence, the diver, upon discerning the output of the warning device, is in effect told to reduce his rate of ascent to a value less than the predetermined maximum rate.

The foregoing elements of the system shown in FIG. 1 can be used in conjunction with additional elements to provide further information. Still referring to FIG. 1, additional comparators can be provided for determining from the sense of $V_5$ whether the diver is ascending or descending. Accordingly, the voltage $V_5$ can be directed to each of a pair of comparators designated respectively as an ascent comparator 17 and a descent comparator 19 for comparison with reference voltage inputs $V_{REF} = 0$ which are of zero value. If $v_5$ exceeds the 0 valve, ascent comparator 17 generates a voltage signal $V_7$. An ascent indicator 21 operatively connected to ascent comparator 17 is triggered in response to the voltage signal $V_7$. Alternatively, when $V_5$ is negative and is less than 0 reference voltage fed to descent comparator 19, a voltage signal $V_8$ is generated which triggers a descent indicator 23. The apropriate one of ascent and descent indicators 21 and 23 generates a signal such as a blinking light or audible tone to indicate to the diver the vertical direction in which he is moving. Therefore, the diver can readily avoid traveling in the wrong direction and the possibly injurious consequences of such a mistake.

Figure 4:
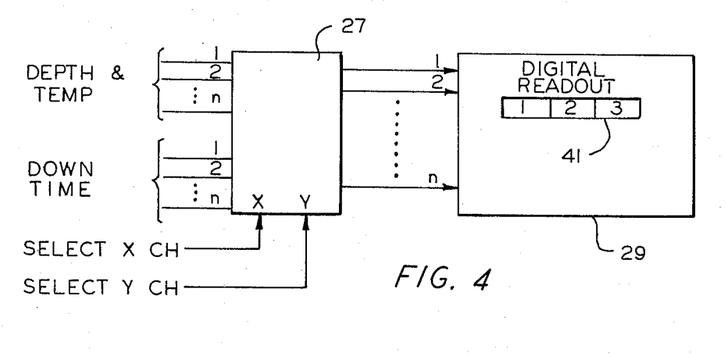
FIG. 4 is a block diagram of a data selector and readout device associated with the system shown in FIG. 1.

The signal generated by pressure transducer 1 and subsequently amplified as a signal $V_2$ has been explained to be a value corresponding to the instantaneous pressure and depth of the measuring instrument. It is convenient to determine from the instantaneous value of $V_2$ the depth at any time. Accordingly, an appropriate converter can be connected to the amplifier associated with the pressure transducer for yielding a depth reading. Hence, the value $V_2$, which is in analog form, can be fed to an analog-to-digital converter 25 shown in FIG. 1 and through a data selector 27 to an appropriate display 29 (FIG. 4). The constructions of such converter, data selector, and display device are described hereinafter.

It is further convenient to provide a temperature transducer in conjunction with the foregoing system for measuring and indicating the instantaneous water temperature. Still referring to FIG. 1, there is shown a temperature transducer 31 for generating a voltage signal $V_{12}$ which is a function of the instantaneous temperature, as expressed in the relationship $V_{12} = f(T)$ where T is the ambient water temperature. Since such a signal is normally very small, it is necessary to feed that signal into an amplifier 33 which in turn generates a signal $V_{13}$. Where the latter amplifier has a gain $G_{33}$, $V_{13}$ obeys the relationship $V_{10} = G_{33}f(T)$. $V_{13}$ is an analog signal which can be passed through the above-mentioned analog-to-digital converter 25, thence to the data selector 27, and finally can be visually displayed on readout device 29.

An essential part of the foregoing system is timing oscillator 9 and associated components which function to control the operation of sample and hold devices 5 and 7, and also to provide timing signals from which downtime is determined. Referring to FIG. 3, the timing oscillator or clock 9 is shown operatively connected to a timing waveform generator 35. Timing oscillator 9 generates a continuous series of regular pulses of predetermined brief duration indicated schematically as timing signal C in FIG. 9. When sample and hold devices 5 and 7 are triggered to take readings at 1 second intervals, an appropriate pulse duration lasts 30 milliseconds, for example. Timing waveform generator 35 responds to the output of timing oscillator 9 to generate these brief pulses, which are indicated schematically in FIG. 9 as timing signals A and B. When the system is adapted to indicate downtime as discussed earlier, it is appropriate to connect to the clock a counter such as counter 37 shown in FIG. 3. Counter 37 counts the number of pulses generated by timing oscillator 9 and generates a signal every time it counts a predetermined number of pulses corresponding to a time period such as one minute. The total number of signals so generated indicates the total downtime in minutes.

A variety of signals are generated by the foregoing system which are most useful if expressed numerically, e.g. depth, temperature, and downtime. The signals reflective of the former two values originate in analog form whereas downtime signals are digital. Where there is but a single output display, data selector 27 shown in FIG. 4 can be used for selecting which values are to be displayed. Signals corresponding to the selected data are transmitted to the illustrated digital readout 29. Data selector 27 must receive a digital input to effect the required digital output, so analog-to-digital convertor 25 shown in FIG. 1 is used to make the necessary conversion of the depth and temperature signals. Data selector 27 has two modes of operation, one for converted digital signals and one for initially digital signals. The mode is determined by means of electrical signals for determining which of two channels, channel X or channel Y, corresponding to the modes, is operative any time. The select switch 39 shown in FIG. 1 determines the operative channel of data selector 27. The output signals of both analog-to-digital convertor 25 and data selector 27 are in the form of digital bits, the number of such bits determining the number of levels of resolution of the digital output.

Information signals transmitted to data selector 27 are selectively transmitted to readout device 29 and converted into readable displays. The readout device shown in FIG. 4 has a digital display 41 of the type incorporating a set of light emitting diodes (LEDs) which are each capable of displaying an integer. A commercially available device which is appropriate for the present system includes three LEDs of seven segments each. The magnitude of the readout depends upon the number of digital bits used, and a 12-bit system would display a maximum number on the three-digit arrangement of 999. The signals transmitted to readout device 29 are selected by select switch 39 shown in FIG. 1.

Figure 5:
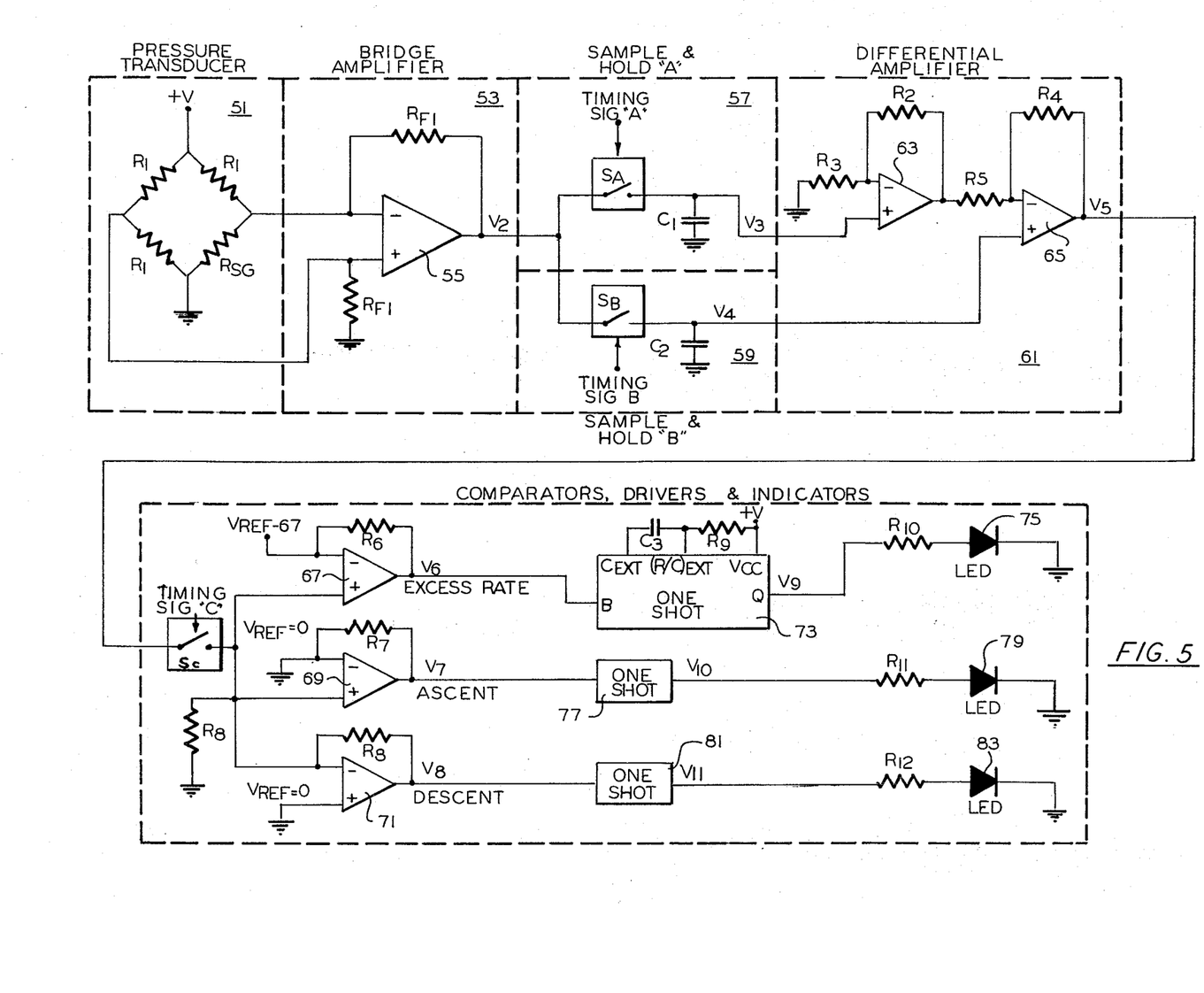
FIG. 5 is a schematic diagram of an embodiment of a portion of the invention shown generally in FIG. 1.

An electrical circuit for practicing the invention set forth in FIG. 1 is depicted in FIG. 5. A balanced bridge circuit 51 having three resistors $R_1$ of equal resistance and a strain gauge in the form of a fourth resistor $R_{sg}$ whose resistive value varies with ambient pressure, is used as pressure transducer 1. Alternative pressure transducers which could be used include LED transducers, potentiometers, AC bridge circuits, magnetic sensors, or piezo electric devices. In the static condition when strain gauge $R_{sg}$ is only subjected to atmospheric pressure, the resistances of resistors $R_1$ and $R_{sg}$ included in bridge 51 have equal values and the current flowing down each side of the bridge is equal. However, when the ambient pressure rises above the atmospheric value, a tensile or compressivve force is exerted on strain gauge $R_{sg}$ causing the latter's resistance to change. This change creates an imbalance in bridge 51 causing the current flowing in the two legs of the bridge to have different values, and the change in current thus resulting is proportionate to the ambient pressure. Since the current change for such devices is normally very weak, a bridge amplifier 53 corresponding to amplifier 3 is operatively connected to bridge 51 to magnify the output signal $V_1$ of the bridge to a usable value. Bridge amplifier 53 includes an operational amplifier 55 of any known type which is compatible with the system, and a feedback resistor $R_{F1}$ which is connected in parallel across operational amplifier 55. A second feedback resistor $R_{F1}$ is connected between the positive input to the operational amplifier and ground.

The output of bridge amplifier 53 which corresponds to the instantaneous ambient pressure is the previously designated voltage signal $V_2$, whose value can be computed by the following relationship:

$$V_2 = V (\Delta R_{sg}/2R_1)(R_{F1}/R_1)$$

where V is the voltage on bridge circuit 51, $\Delta R_{SG}$ is the change in the resistance of $R_{SG}$, $R_1$ is the resistance of each of the other resistors $R_1$, and $R_{F1}$ is the resistance of feedback resistors $R_{F1}$ of bridge amplifier 53.

In order to determine the rate of pressure change for comparison with a predetermined standard, provision is made in the invention for making sequential measurements of the value of $V_2$ at predetermined timed intervals. Such measurements are made by means of sample and hold circuits 57 and 59 connected to the output line of bridge amplifier 53. The intervals at which the sequential measurements are made are controlled by the waveform generator 35 shown schematically in FIG. 3. Sample and hold circuits 57 and 59 include switches $S_A$ AND $S_B$ respectively, which close in response to the generation of timing signals A and B from waveform generator 35 in the clock circuit, and respective capacitors $C_1$ and $C_2$ for storing voltage signals corresponding to the instantaneous values of $V_2$. Thus, switch $S_A$ closes for a brief period in response to timing signal A to cause capacitor $C_1$ to charge to the instantaneous value of $V_2$, capacitor $C_1$ retaining that charge after switch $S_A$ opens. Switch $S_B$ closes in response to the generation of timing signal B which occurs at a predetermined time period such as one second (less the pulse width) after the last generation of timing signal A. Upon the closing of switch $S_B$, capacitor $C_2$ charges to the instantaneous value of $V_2$. $S_B$ opens immediately after it closes, but capacitor $C_2$ retains its charge. The charging period for the two capacitors is so brief as to be negligible, on the order of 10 milliseconds for example. The outputs of sample and hold circuits 57 and 59, i.e., voltage signals $V_3$ and $V_4$ respectively, are transmitted to a differential amplifier 61 which functions to amplify the difference between the two signals, which difference is reflective of the rate of change of pressure experienced by pressure transducer 51.

Differential amplifier 61 includes a first operational amplifier 63 for receiving voltage signal $V_3$ from sample and hold circuit 57, and a second operational amplifier 65 for receiving the output of both amplifier 63 and the signal $V_4$ from sample and hold circuit 59. A feedback resistance $R_2$ is connected in parallel across operational amplifier 63 and a resistor $R_3$ references the negative input port of amplifier 63 to ground. A resistor $R_4$ is connected in parallel with operational amplifier 65, and resistor $R_5$ is in the line connecting amplifiers 63 and 65. The output of differential amplifier 61 is designated by the term $V_5$ and, as indicated, is reflective of the rate of change of the ambient pressure, and is therefore equivalent to the actual rate of ascent. The value of $V_5$ can be determined according to the following relationship:

$$V_5 = [1 + (R_4/R_5)](V_4 - V_3)$$

assuming $R_3/R_2 = R_4/R_5$. A new signal $V_5$ is generated at regular intervals determined by the periods between successive pulses to each of the sample and hold circuits 57 and 59. Capacitors $C_1$ and $C_2$ are adapted to hold their stored voltages for long periods when am amplifier 61 is selected whose positive ports have a high input impedance on the order of $10^{12}$ ohms. Voltage signal $V_5$ is transmitted to an array of comparators 67, 69 and 71 which respectively compare the input signal $V_5$ with a predetermined reference signal $V_{REF-67}$ corresponding to a predetermined rate of pressure change and therefore, rate of ascent, and for comparison with 0 reference voltages for indicating whether pressure transducer 51 is ascending or descending. Voltage signal $V_5$ is transmitted to the comparators in regular intervals as determined by the frequency of timing signal C generated by the timing oscillator, which effects the responsive closing of a switch $S_C$.

Comparator 67 is an operational amplifier which receives as an input voltage $V_5$ for comparison with reference input $V_{REF-67}$, and has a parallel-connected feedback resistor $R_6$. The voltage signal $V_{REF-67}$ corresponds to a value of one foot per second rate of ascent when the system is to be used in conjunction with the U.S. Navy Decompression Tables. If the value of the voltage signal $V_5$ exceeds the value of the reference signal $V_{REF-67}$, comparator 67 generates a signal $V_6$ whose positive going edge triggers a monostable multivibrator 73 of a known type. When triggered, multivibrator 73 in turn generates an output $V_9$ which energizes an appropriate alarm signal. Multivibrator 73 is a one-shot multivibrator which remains energized for a predetermined and well defined period once triggered. The existence of such an alarm signal warns the diver that he is ascending at an unsafe rate. The illustrated alarm mechanism in an LED 75 which lights when ignited. LED 75 will blink at a duty cycle determined by resistor $R_9$ and a capacitor $C_3$ connected to the appropriate ports of monostable multivibrator 73. These elements function to establish the time period during which monostable multivibrator 73 remains active once energized, to determine the duration of the on-time of each ignition period of the blinking warning signal. An appropriate duration would be about one-half second. The line leading to LED 75 includes a resistor $R_{10}$ which limits the current to LED 75 to a safe value.

Comparators 69 and 71 are similar to ascent rate comparator 67 and have as their reference input signal a voltage of 0 value for comparison with $V_5$. So long as the depth at which pressure transducer 51 is operating does not change, neither of the latter comparators generates a signal. However, whenever the diver ascends, the ambient pressure decreases and $V_5$ is a positive signal. When $V_5$ is positive, comparator 69 generates a signal $V_7$ which triggers a one-shot monostable multivibrator 77. Multivibrator 77 in turn generates a voltage signal $V_{10}$ which passes through a current limiting resistor $R_{11}$ to energize an LED 79. Likewise, when the diver is descending, voltage signal $V_5$ is negative as compared to the input reference voltage of comparator 71, and a voltage signal $V_8$ is generated and transmitted to a one-shot monostable multivibrator 81. This multivibrator generates a voltage signal $V_{11}$ which passes through current limiting resistor $R_{12}$ to actuate another LED 83. Preferably, the ascent and descent LEDs 79 and 83 are colored differently so that the diver can readily understand his direction of motion. It would be possible to incorporate an arrow design in place of, or in addition to, the latter color arrangements to render the ascent and descent signals more readily comprehendible. Resistors $R_6$, $R_7$, and $R_8$ are provided as feedback resistors to help maintain the stability of each of comparators 67-71.

Figure 6:
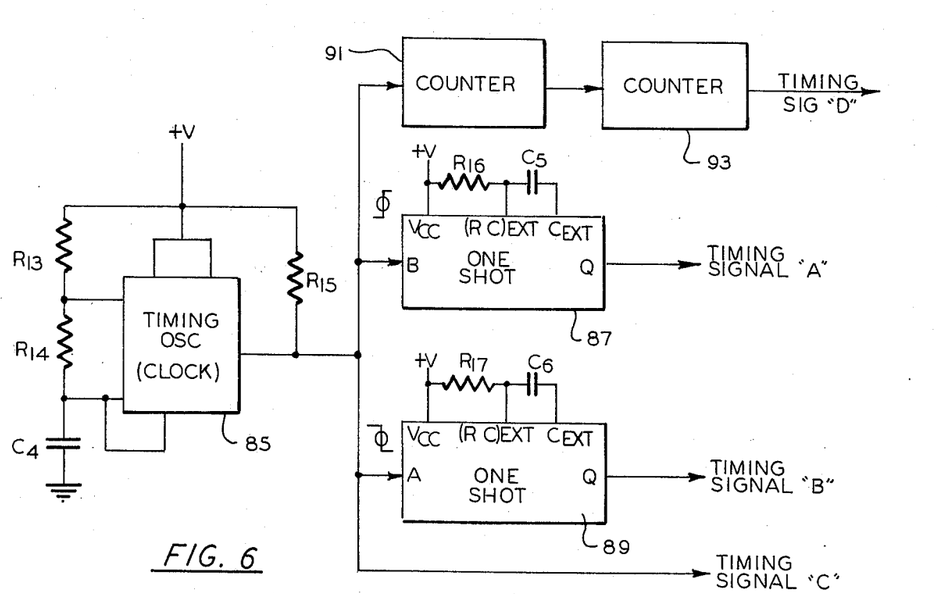
FIG. 6 is a specific embodiment of the timing network shown generally in FIG. 3.

A circuit for generating the necessary signals for closing switches $S_A$ and $S_B$ in FIG. 5 and for generating other timing signals mentioned with respect to the network shown in FIG. 3 is depicted in FIG. 6. The circuit includes an electrically powered timing oscillator or clock 85 which can be of known construction. The timing oscillator shown in the drawing is the model 555 integrated circuit timer manufactured by the Signetics Company of Sunnyvale, California. A group of resistors $R_{13}$, $R_{14}$, $R_{15}$ and a capacitor $C$, are connected to the appropriate ports of clock 85. Timing oscillator 85 generates pulses of equal duration at a constant frequency, shown in FIG. 9 as timing signal C. The duration and frequency of these pulses controls all of the time-related signals involved in the apparatus. The pulse characteristics are established by resistors $R_{13}$ and $R_{14}$ and be capacitor $C_4$. The proper selection of the values of these components can be made with a data sheet used in conjunction with the Signetics' unit. It has been found that the output of timing oscillator 85, i.e. timing signal C, can apropriately have a duration of thirty milliseconds and a frequency of sixty pulses per minute or a total cycle time of one second. The pulsating electrical signals generated by timing oscillator 85 are transmitted to each of a pair of one-shot monostable multivibrators 87 and 89 which, as explained below, in turn generate timing signals A and B respectively through their outlet ports Q for closing switches $S_A$ and $S_B$ in sample and hold circuits 57 and 59. Timing signal C from clock 85 is also transmitted to counters 91 and 93, and to switch $S_C$ in the transmission line leading to comparators 67-71.

Monostable multivibrators 87 and 89 are preferably of a known type such as model Ser. No. 74121 integrated circuit manufactured by Texas Instruments Company of Dallas, Texas. Monostable multivibrator 87 generates timing signal A in response to positive going signals received at its inlet Port B from timing oscillator 85, such signals occurring at the termination of each pulse of the timing oscillator as shown in FIG. 9. Monostable multivibrator 89 on the other hand is responsive to negative going pulses received at its inlet port A from timing oscillator 85, and is triggered in response to the commencement of each of the foregoing pulses to generate timing signal B in FIG. 9. The duration of the signals of each of monostable multivibrators 87 and 89 is determined by the selection of resistor $R_{16}$ and capacitor $C_5$ connected to the proper ports of multivibrator 87, and by the selection of resistor $R_{17}$ and capacitor $C_6$ connected to multivibrator 89. It has been found that an appropriate duration of such signals is 10 milliseconds. When the cycle time of timing oscillator 85 is 1 second, the two multivibrators 87 and 89 generate their 10 millisecond signals at one second intervals, and the delay between the commencement of the triggering of monostable multivibrator 87 following the triggering of multivibrator 89 as determined by the duration of each pulse of the timing oscillator is 30 milliseconds. It can be seen that voltage signal $V_5$ generated by differential amplifier 61 depicted in FIG. 5 is a pulse whose duration is determined by the length of time between the commencement of each pulse of multivibrator 89 and the commencement of each pulse of multivibrator 87, so that the duration of each voltage signal $V_5$ is coextensive with the duration of each pulse of the timing oscillator. The foregoing relationship is depicted graphically in FIG. 9.

The signals generated by timing oscillator 85 are also transmitted to counters 91 and 93 corresponding to counters 37 in FIG. 3. Since the counters are used to generate signals for informing a diver of his total downtime, a value usually expressed in minutes, it is appropriate to select a pair of counters 91 and 93 connected in series which convert the sixty pulse per minute signals of timing oscillator 85 first to a six cycle per minute frequency and then to a one cycle per minute frequency. The net output of counters 91 and 93 is thus one pulse for each minute of downtime, such signal being readily converted to a visible output on the digital readout device. Counters 91 and 93 are conventional electronic counters which are commercially available from a variety of sources.

Figure 7:
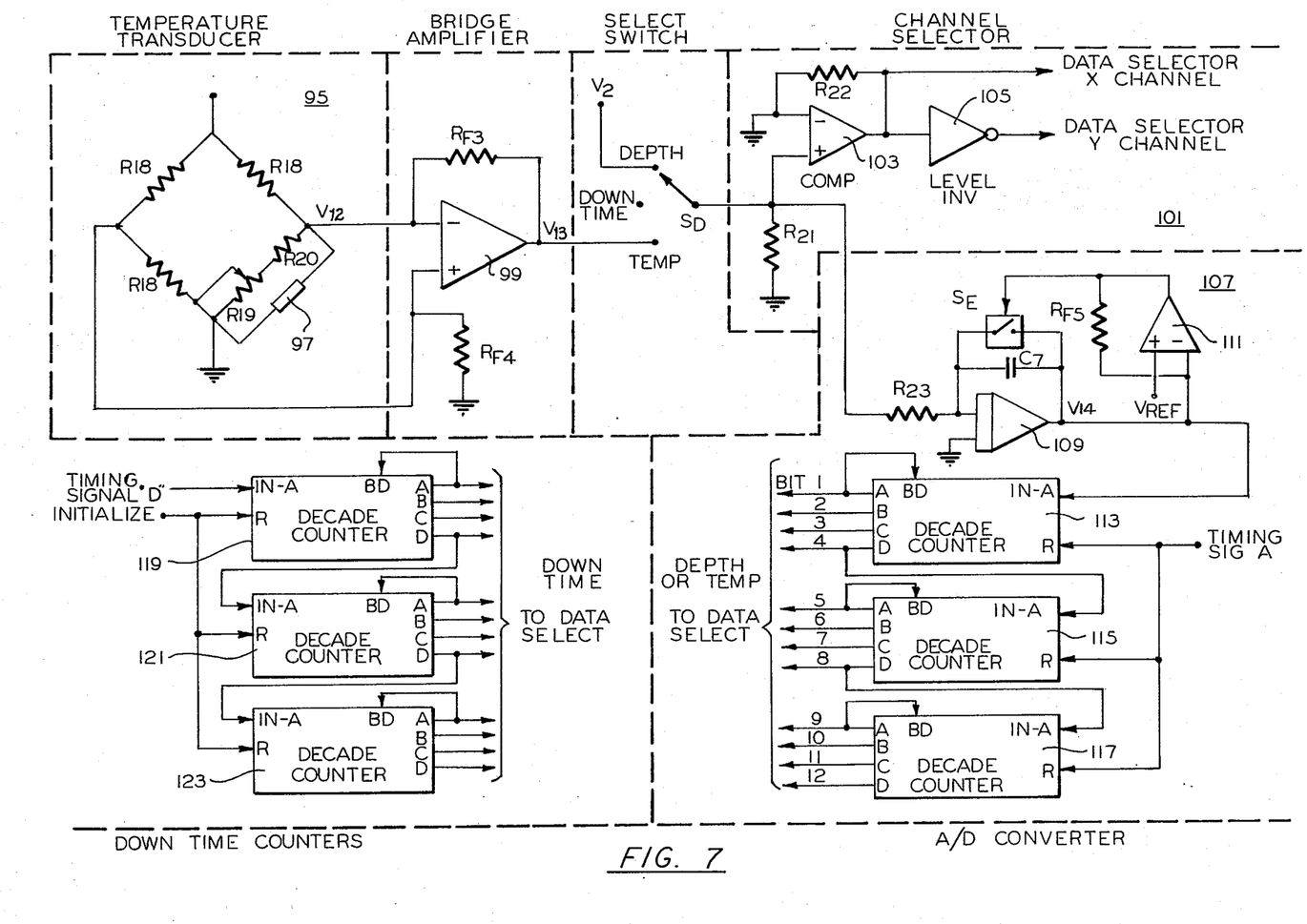
FIG. 7 is a specific embodiment of a portion of the system illustrated in FIGS. 1 and 3.

A circuit for performing the electronic functions for selectively indicating depth, water temperature, and downtime and the data selection circuitry for selecting the output of the apparatus, are shown in FIG. 7. The circuitry for indicating water temperature includes a temperature transducer, an amplifier, and appropriate select switches as shown in FIG. 1. An appropriate temperature transducer is bridge circuit 95 shown in FIG. 7, which includes three legs having resistors $R_{18}$ of equal value, and a fourth leg having a variable resistor $R_{19}$ and a resistor $R_{20}$. The latter resistors are connected in series with each other and in parallel with a temperature sensitive element 97. Temperature sensitive element 97 can be a thermistor, a heat sensitive diode, a heat sensitive transistor, or the like. An imbalance of current flowing through the adjacent legs of bridge 95 results in response to the sensing of temperature by temperature sensitive element 97, and this imbalance generates a weak electrical signal which is amplified by a bridge amplifier 99 connected to the temperature transducer. The gain of the bridge amplifier is determined by the value of resistor $R_{F3}$ in the feedback line of the bridge amplifier. A grounding resistor $R_{F4}$ is provided on the line to the positive port of amplifier 99. The amplifier itself is of any known type as discussed earlier. Bridge amplifier 99 transmits a signal $V_{13}$ which is equal to the signal $V_9$ generated by bridge 95 multiplied by the gain of bridge amplifier 99. The voltage signal $V_{13}$ can be converted to a comprehensible signal indicative of the water temperature as discussed below.

Referring back to FIG. 5, the voltage signal $V_2$ is indicative of the instantaneous water pressure and hence the instantaneous depth. Therefore, no additional circuitry is required for generating a signal corresponding to this value. Voltage signal $V_2$ corresponding to a diver's depth and voltage signal $V_{13}$ corresponding to the water temperature are in analog form as generated. In order to display these signals in a numerical display to inform the diver of their respective values, they must be converted to a digital equivalent. Therefore, signals $V_2$ and $V_{13}$ must pass through an analog-to-digital converter 107 corresponding to device 25 shown in FIG. 1 and discussed earlier. Since the apparatus is constructed to give a readout corresponding to only one of the possible information signals, a select switch $S_D$ shown in FIG. 7 as a three-position toggle switch is provided. By the appropriate adjustment of switch $S_D$, either a depth, downtime, or temperature reading is effected.

Since the downtime signals originating with timing oscillator 85 are in digital form, these signals can be transmitted to the data selector shown schematically in FIG. 4 directly. The data selector must be programmed according to the type of signals it is to receive and transmit to the readout device, i.e. it must be programmed to receive direct digital signals corresponding to downtime or to receive signals converted from an analog to a digital form corresponding to depth and temperature. Referring to FIG. 7, a channel selector 101 is provided including a comparator 103, a level inverter 105, and associated resistors $R_{21}$ and $R_{22}$ for automatically selecting the effective one of channels X or Y of the data selector, which adapt the data selector to receive digital or analog-to-digital signals respectively. Comparator 103 and level inverter 105 and their associated components are arranged so that whenever a positive voltage signal, e.g. depth signal $V_2$ or temperature signal $V_{13}$, is fed to comparator 103, a positive signal is transmitted by channel selector 101 to the data selector, and the data selector is switched to its X channel. On the other hand, when comparator 103 receives no signal, its output is zero and therefore the output of level inverter 105 is positive to provide a voltage to the Y channel of the data selector. The selection of the kind of signal to be fed to the channel selector is made by the positioning of select switch $S_D$. When switch $S_D$ is positioned to transmit either the depth or temperature signals, the voltage across comparator 103 is positive and the data selector is switched to its X channel and the Y channel is off. However, when switch $S_D$ is at the downtime position, there is no voltage impressed across comparator 103 because resistor $R_{21}$ is connected to ground, so that the output of level inverter 105 is positive and the Y channel of the data selector is turned on and the X channel is off.

When switch $S_D$ is in either the depth or temperature positions in FIG. 7, the selected one of signal $V_2$ and $V_{13}$ is transmitted into analog-to-digital convertor 107, through a resistor $R_{23}$ to an integrating amplifier 109 of any appropriate type. Integrating amplifier 109 is connected in parallel with a type. Integrating amplifier 109 is connected in parallel with a capacitor $C_7$ of a fixed predetermined capacitance, and a switch $S_E$ under the control of a comparator 111 also of any appropriate known type having connected thereacross a feedback resistor $R_{F5}$. The output of integrating amplifier 109 is a voltage signal $V_{12}$. For the short intervals of time commensurate with the measuring period (i.e. one second), the voltage signals $V_2$ and $V_{13}$ change by such a small amount as to be considered very nearly constant, so that the output of integrating amplifier 109 obeys the following relationship:

$$V_4(t) = Vt/R_{23}C_7$$

where $V_{14}(t)$ is the output as a function of time, V is the input ($V_2$ or $V_{13}$), $t$ is the time, and $R_{23}$ and $C_7$ are the resistance and capacitance of resistor $R_{23}$ and capacitor $C_7$ respectively. It can be seen from the preceding relationship that $V_{14}$ increases linearly with time, its rate being dependent upon the magnitude of V, $R_{23}$, and $C_7$. Since $R_{23}$ and $C_7$ are of fixed value, the rate of change of $V_{12}$ only changes in response to changes in the input voltage $V_2$ or $V_{13}$. Referring to FIG. 9, the waveform of $V_{14}$ is depicted for cases where the value of V ($V_2$ or $V_{13}$) is changing.

Voltage signal $V_{14}$ generated by integrating amplifier 109 is impressed across comparator 111. The rate or slope of $V_{14}$ as shown in FIG. 9 increases with increasing depth or temperature, depending upon which of signals $V_2$ or $V_{13}$ is the input signal of integrating amplifier 109. In order to simplify the circuitry of the system, the components are selected so that the same amplitude signal of $V_2$ and $V_{13}$ is generated for equal depth and temperature values. For example, both $V_2$ and $V_{13}$ can have a value of 5 volts for a depth of 45 feet or a temperature of 45° F respectively. The slope of voltage $V_{14}$ increases for increasing depth and temperature as shown, for example, in FIG. 9. When voltage $V_{14}$ reaches the threshold value of comparator 111, comparator 111 is triggered to close switch $S_E$ connected across capacitor $C_7$. The resulting short circuiting of capacitor $C_7$ causes voltage signal $V_{14}$ to return to zero instantly, thereby causing comparator 111 to relinquish its influence over switch $S_E$, which is biased to the open position. Hence, switch $S_E$ opens immediately and $V_{14}$ begins increasing in value again.

The saw-tooth signals $V_{14}$ are transmitted to decade counters 113, 115 and 117. These counters are commercially available in a variety of forms. In operation, each counter generates a signal corresponding to the number of saw tooth signals it receives in a period of time determined by a timing signal. For convenience and economy, it is appropriate to use the same timing signal from the timing oscillator shown in FIGS. 3 and 6 for operating switch $S_A$ in sample and hold circuit 57 to determine the counting periods of decade counters 113–117. Therefore, the pulses of $V_{14}$ are counted every second using the preceding example. Each decade counter has an inlet terminal "IN-A" and outlet ports A, B, C, and D corresponding to the number of bits or levels of resolution or accuracy in the decade counter. Each decade counter 113–117 counts the number of pulse inputs up to nine, the tenth resetting it to zero while simultaneously being transmitted to the next successive decade counter to give it a count of one, two, etc., on up to nine and then zero. Thus, there is a transmission line from the outlet terminal D (activated on the tenth pulse) of each decade counter to the inlet of the successive counter. The maximum number the illustrated decade counters 113–117 can indicate is 999 after which the entire display will return to zero.

A set of counters 119–123 for generating signals indicative of downtime are substantially identical to decade counters 113–117. The input to counters 119–123 is timing signal D from counter 93 shown in FIG. 6. Since timing signal D is already in pulse form, there is no need to feed the inlet signal through analog-to-digital converter 107. The inlet voltage signal to decade counters 119–123 thus is transmitted directly from timing oscillator 85 (through counters 91 and 93) at a convenient frequency such as the aforementioned 60 pulses per minute. As with decade counters 113–117, decade counters 119–123 are triggered to count in response to he negative edge of each pulse of the inlet signal to the respective counters. Decade counters 119–123 thus count one digit per minute, with each decade counter having a capacity of 10 integers (0 through 9) so that the maximum number of minutes which can be counted is 999 according to the depicted arrangement. Of course, the capacities of both groups of decade counters 113–117 and 119–123 can be modified by changing the number of counters in these groups. The resset ports in decade counters 119–123, i.e. those ports designated by the letters R, are adapted to reset decade counters 119–123 to zero as soon as the power to the entire system is turned which, as explained hereinafter, occurs when the apparatus is initially submerged. By this arrangement, the diver can be assured that his downtime is measured from his initial submersion in the course of a dive, so that the measurement does not reflect the cumulative downtime of previous dives.

Figure 8:
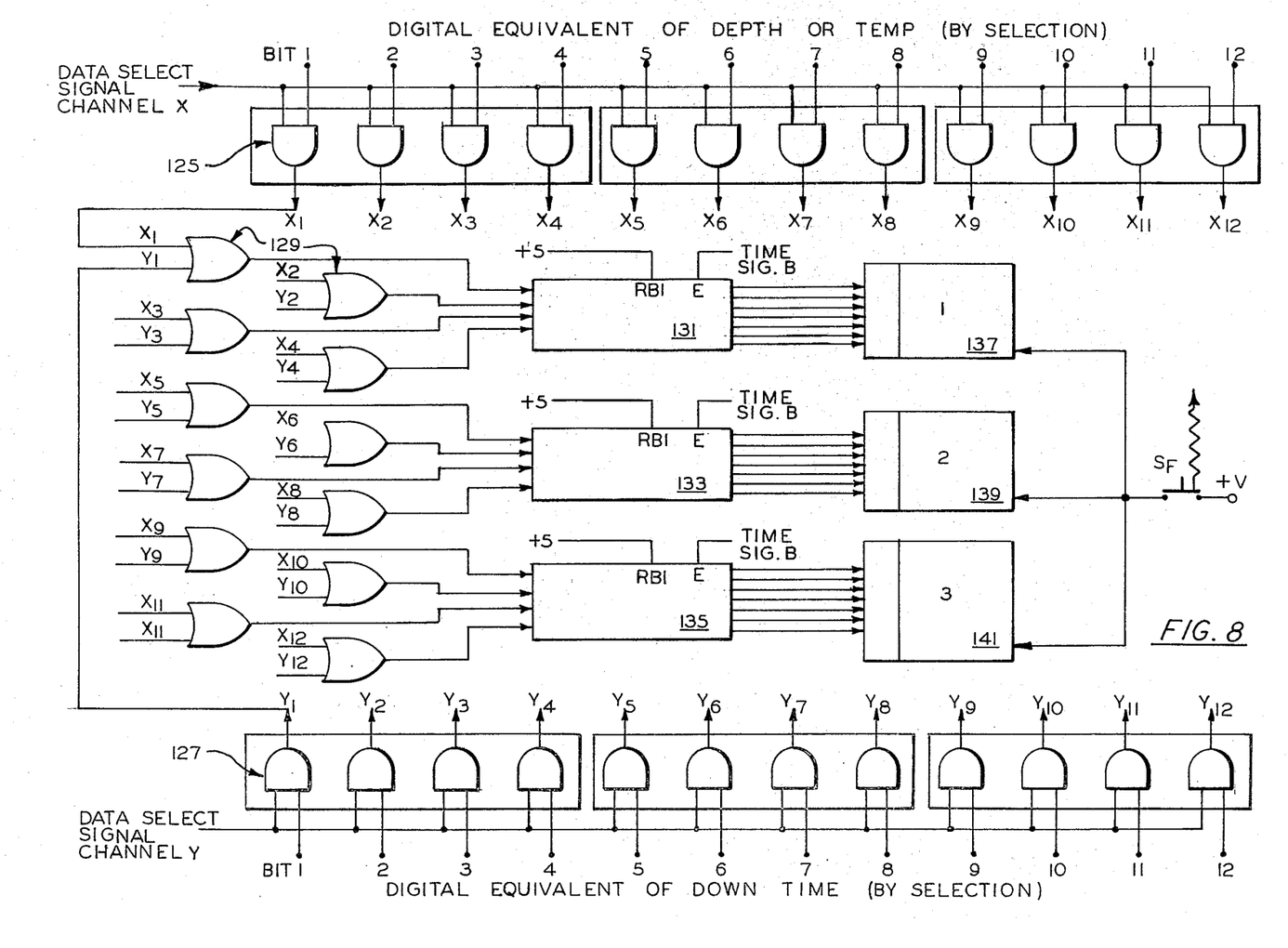
FIG. 8 is a schematic illustration of the data selector and digital display device shown generally in FIG. 4.

The data selector and readout display circuits are shown in FIG. 8. The circuits include two channels X and Y which are selectively activated according to whether the depth or temperature, or downtime respectively are to be displayed on the digital readout. Each channel includes a series of "AND" gates 125 and 127 respectively, these gates being used to receive the digital signals generated in the system as discussed above, and being standard integrated circuits which are readily commercially available. Each bit of data in the form of an electrical signal from the various digital counters is transmitted as one input to each of the individual AND gates. A second input to each of the AND gates is the data select signal discussed with regard to FIG. 7. As indicated with regard to FIG. 7, the transmission of a positive signal ($V_2$ or $V_{13}$) to channel selector 101 activates only the X channel of the data selector and the series of twelve gates 125 at the upper portion of FIG. 8, whereas the Y channel and the twelve gates 127 at the lower portion of FIG. 8 are activated when a zero or a non-positive signal is transmitted through select switch $S_D$ to the channel selector. The AND gates function in the conventional manner to yield the foregoing result. Thus, each AND gate in each channel can receive two inputs as explained earlier, one information input (depth or temperature, or downtime signal), and one input from the channel selector. When both inputs of an AND gate are high or positive, the AND gate is active. Hence, either X channel AND gates or Y channel AND gates are activated at any one time, but they never function simultaneously. The output signals of gates 125 are designated by the numerically subscripted letter X and the output signals of gates 127 are designated by the numerically subscripted letter Y.

AND gates 125–127 in the selected channel transmit the information signals received by them to OR gates 129 as shown in FIG. 8, which in turn pass the signal received from the AND gate to a decoder 131, 133 or 135 connected to the respective OR gates. The depicted decoder drivers are each of a known type having seven segments These decoder drivers can be for example model 9368 integrated circuits manufactured by the Fairchild Company of Mountain View, California. Decoder drivers 131–135 are respectively operatively connected to digital displays 137–141 of the digital readout device. As mentioned earlier, such digital displays are known in the art and are preferably LED displays. Each display is capable of displaying any integer from 0 to 9, and displays 137–141 display the ones, tens and hundreds digits respectively. Since such digital displays have relatively high power requirements, it is advantageous to de-energize them until a readout is desired. Therefore, an on-off switch $S_F$ in the form of a push button biased to the open position is provided connecting the power source to the displays. When a reading is desired, the push button is depressed to complete the circuit to the electrical power source.

Figure 10:
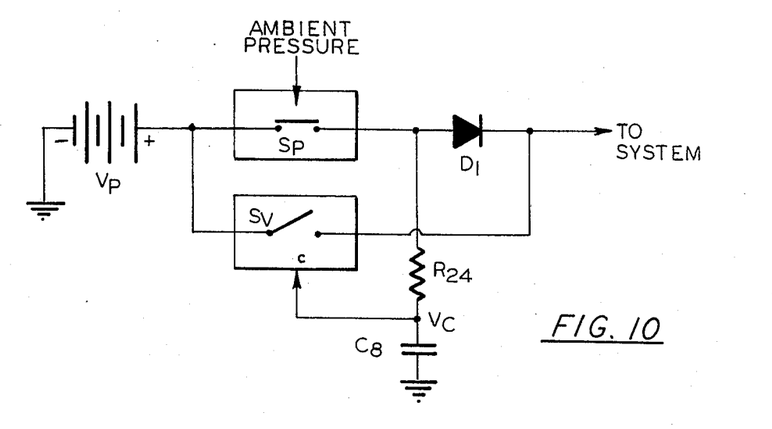
FIG. 10 is an electrical diagram of the power source shown generally in FIG. 2.

The most appropriate source of power for the system is a battery. There are many commercially available batteries which are compact yet provide ample electrical power for systems having electrical requirements similar to those of the present invention. However, batteries do become depleted with continued use, and it is desirable to restrict the use of the battery to those times when a diver is submerged. It is also important that the system be energized whenever the diver enters the water and dives to a depth indicative that a prolonged dive is impending, so that accurate measurements of downtime and the like can be made. Therefore, it is extremely desirable that means be provided for activating the energy source only when the diver has entered the water and only when a deep or prolonged dive is occurring. Such means are depicted in FIG. 10. FIG. 10 shows a power source $V_P$ which can be in the form of a battery as described above, connected in series with a pressure switch $S_P$ which is constructed to close and complete the circuitry of the system at a predetermined pressure, which would normally be indicative of a keep and prolonged dive, such as the water pressure occurring at a depth of 5 feet. When switch $S_P$ closes, the system is energized and the various physical measurements are made and converted to comprehendible signals. The downtime is measured from the instant the diver reaches the five foot depth or whatever predetermined value has been selected.

It is advantageous that the turning off of energy source $V_P$ be delayed after the diver ascends to the predetermined "turn-on" depth, so that the diver can have a period following his dive to selectively make readings relating to the dive, particularly his total downtime. Therefore, an electronic switch $S_V$ is connected in parallel with ambient pressure switch $S_P$, and a diode $D_1$, a resistor $R_{24}$, and capacitor $C_8$ are connected as shown. When switch $S_P$ closes at the commencement of a dive to the predetermined depth, capacitor $C_8$ charges at a controlled rate through resistor $R_{24}$. When the capacitor voltage $V_c$ reaches a predetermined value, switch $S_V$ closes and power passes to the entire system through both switches $S_P$ and $S_V$. When the diver ascends to the predetermined "turn-on" depth (5 feet in this example), switch $S_P$ opens, but electronic switch $S_V$ remains closed so long as voltage $V_c$ is of sufficient amplitude to keep the latter switch on. Voltage $V_C$ is less positive than $V_p$ and cannot pass through diode $D_1$. Therefore, capacitor $C_8$ commences its discharge through the input impedence of the control port c of electronic switch $S_V$ since the capacitor is no longer connected to the power source. The characteristics of electronic switches $S_V$, resistor $R_{24}$ and capacitor $C_8$ determine the discharge rate and total capacity of capacitor $C_8$, and hence the time period during which switch $S_V$ remains closed after switch $S_P$ opens, which in turn establishes the amount of time during which the system remains energized after the pre-determined depth has been ascended to. For example, if the control port of switch $S_V$ has an impedance $Z_c$ on the order of $10^{12}$ ohms or higher, and capacitor $C_8$ has a value as small as 0.01 microfarads, the time constant $\tau$ of decay on control voltage $V_c$, will be on the order of 166 minutes (since $\tau = Z_c C_8$ while there is no current flow through $R_{24}$). Switch $S_V$ can be selected so that it opens before the entire time constant is realized; however, the magnitude of the time constant indicates the great latitude which the designer has in selecting the delay time of the electronic switch.

The embodiments of the invention described above are extremely reliable, economical, and fast in response time. The system is susceptible of very compact construction and, using conventionally available components, can be constructed small enough for a diver to wear on his wrist. The components should be encased in a waterproof and corrosion resistant container, and such containers are well known in the art. Although the invention has been described as incorporated in a device for use in a body of water, it can be adopted for use in any environment wherein pressure varies with height or depth. Therefore, the term depth used herein encompasses heights as well, as where a system according to the invention is used in an environment wherein pressure decreases with height.

The invention has been described in detail with particular reference to preferred embodiments thereof, but variations and modifications may occur to those skilled in the art to which the invention pertains.

We claim:

1. A system for providing information relating to depth and movement in a fluid, said system comprising:
    an electrical power source;
    a pressure transducer connected to said electrical power source for generating electrical signals having a parameter reflective of the instantaneous depth;
    means for generating alternating first and second timing signals at a regular frequency;
    first and second sampling and holding means electrically connected to said pressure transducer and to said means for generating the first and second timing signals, for storing electrical signals generated by said pressure transducer and for alternately transmitting a previously stored electrical signal, in response to the first and second timing signals;
    differentiating means electrically connected to said first and second sampling and holding means for generating an electrical signal having a parameter corresponding to the difference between the parameters reflective of the instantaneous depth, of successive signals transmitted by said first and second sampling and holding means;
    a reference electrical source for establishing a reference electrical signal having a reference parameter reflective of a predetermined rate of change of depth;
    comparing means electrically connected to said differentiating means and to said reference electrical source for comparing said parameter of said signal generated by said differentiating means and said reference parameter, and for generating a warning signal when said parameter of the signal generated by said differentiating means exceeds said reference parameter, said comparing means being normally disabled from performing said comparing and generating functions;
    enabling means electrically associated with said comparing means for enabling said comparing means to perform said comparing and generating functions in response to reception of timing signals; and
    means for generating enabling timing signals to said enabling means at the rate at which said comparing means is to perform said comparing function.

2. The invention according to clam 1, and said system further includes:
    readout means for converting electrical information signals into intelligible signals;
    counting means for counting the number of timing signals generated by said means for generating enabling timing signals and for generating electrical signals reflective of the number of timing signals so counted; and,
    means for transmitting the electrical signals reflective of the number of timing signals so counted to said readout means.

3. A system for providing information relating to depth and movement in a fluid, said system comprising:
    an electrical power source;
    depth responsive means connected to said electrical power source for generating electrical signals having a parameter reflective of the instantaneous depth;

measuring means electrically connected to said depth responsive means for storing electrical signals having a parameter reflective of the instantaneous depth, and actuable for generating electrical signals having a parameter corresponding to the difference in value of said instaneous depth parameter measured at subsequent intervals and reflective of the actual rate of change of depth of the system, said measuring means including actuating means responsive to timing signals for actuating said measuring means;

means electrically connected to said actuating means for generating first electrical timing signals at predetermined intervals to said actuating means, to effect the actuation of said measuring means in repetitive sequence;

means for establishing a referencce signal having a parameter reflective of a predetermined rate of change of depth;

comparing means electrically connected to said reference signal establishing means for comparing the signal parameter reflective of the actual rate of change of depth with the reference signal parameter reflective ot the predetermined rate of change of depth, and for generating a warning signal when the actual rateof change of depth exceeds the predetermined rate of change of depth;

enabling means operatively associated with said comparing means and actuable for enabling said comparing means to compare said parameters; and means electrically connected to said enabling means for generating second electrical timing signals according to the frequency at which said signal parameters reflective of the actual rate of change of depth are to be compared with said reference signal parameter reflective of a predetermined rate of change of depth, to repetitively actuate said enabling means at said frequency.

4. The invention according to claim 3 wherein said means for generating electrical signals reflective of the instantaneous depth comprises:

a pressure transducer having pressure sensitive means for generating voltage signals proportional to the pressure sensed at the instantaneous depth.

5. The invention according to claim 3 wherein said system further includes:

timing means for generating electrical timing signals at predetermined regular intervals; and, said means for measuring the electrical signals reflective of the instantaneous depth includes a plurality of sample and hold devices each having means actuatable to store the electrical signals reflective of the instantaneous depth, and switching means for actuating said storing means in response to the sensing of said timing signals, said timing means transmitting said timing signals to each of sample and hold devices in turn in repetitive sequence.

6. The invention according to claim 3 and further including:

readout means for converting electrical information signals into intelligible signals; and means for transmitting electrical signals generated by said depth responsive means to said readout means.

7. The invention according to claim 3 and further including:

temperature responsive means connected to said electrical power source for generating electrical signals reflective of the ambient temperature;

readout means for converting electrical information signals into intelligible signals; and means for transmitting electrical signals transmitted by said ambient temperature responsive means to said readout means.

8. The invention according to claim 3 and further including:

a pressure switch connected to said electrical power source, said pressure switch connecting said electrical power source to the balance of said system in response to the exertion of a first pressure on said pressure switch, and said pressure switch disconnecting said electrical power source from the balance of said system in response to the exertion of a second pressure on said pressure switch.

9. A system for providing information relating to depth and movement in a fluid, said system comprising:

an electrical power source;

depth responsive means connected to said electrical power source for generating electrical signals having a parameter reflective of the instantaneous depth;

means for measuring the values of the electrical signal parameter reflective of the instantaneous depth at predetermined intervals, said measuring means generating electrical signals having a parameter corresponding to the difference between said values measured at subsequent intervals and reflective of the actual rate of change of depth of the system over said intervals;

means for establishing a reference signal having a parammeter reflective of a predetermined rate of change of depth;

comparing means electrically connected to said reference signal establishing means for comparing the signal parameter reflective of the actual rate of change of depth, with the reference signal parameter reflective of the predetermined rate of change of depth, said comparing means generating an electrical warning signal when the actual rate of change of depth exceeds the predetermined rate of change of depth; and means for comparing with each other electrical signal parameters reflective of the actual rate of change of depth measured at said subsequent intervals, said comparing means generating signals indicative of the direction of vertical movement through the fluid by the system according to the relative values of said measured signals.

10. A system for providing information relating to depth and movement in a fluid, said system comprising:

an electrical power source;

depth responsive means connected to said electrical power source for generating analog electrical signals having a parameter reflective of the instantaneous depth;

means for measuring the values of the electrical signal parameter reflective of the instantaneous depth at predetermined intervals, said measuring means generating electrical signals having a parameter corresponding to the difference between said values measured at subsequent intervals and reflective of the actual rate of change of depth of the system over said intervals;

means for establishing a reference signal having a parameter reflective of a predetermined rate of change of depth;

comparing means electrically connected to said reference signal establishing means for comparing the signal parameter reflective of the actual rate of change of depth, with the reference signal parameter reflective of the predetermined rate of change of depth, said comparing means generating an electrical warning signal when the actual rate of change of depth exceeds the predetermined rate of change of depth;

readout means for converting digital electrical information signals into intelligible signals;

analog-to-digital converting means for converting analog electrical signals to digital electrical signals;

means for transmitting analog electrical signals generated by said depth responsive means to said analog-to-digital converting means; and, means for transmitting digital electrical signals from said analog-to-digital converting means to said readout means.

11. The invention according to claim 10 wherein said analog-to-digital converting means comprises:

integrating amplifier means for receiving analog electrical signals and for generating corresponding voltage signals which increase with time;

capacitor means connected in parallel with said integrating amplifier means;

an electrical bypass line connected in parallel with said capacitor means;

a switch connected in said bypass line, said switch closing to short circuit said capacitor means in response to an electrical signal transmitted to said switch;

electrical comparator means electrically connected with the outlet of said integrating amplifier means and with said bypass line switch, said electrical comparator means generating a signal in response to the generation of voltage signals of a predetermined threshold value by said integrating amplifier means, to close said bypass line switch to immediately decrease the value of the voltage signal generated by said integrating amplifier means to a lower value from which low value said voltage signal increases with time until the predetermined threshold value is again reached, said integrating amplifier means transmitting digital signals defined by the commencement of the generation of each voltage signal which increases with time and the occurrence of said threshold value.

12. The invention according to claim 10 and further including:

temperature responsive means connected to said electrical power source for generating analog electrical signals reflective of the ambient temperature;

means for selectively transmitting the analog electrical signals generated by said temperature responsive means or the analog electrical signals generated by said depth responsive means to said analog-to-digital converting means.

13. The invention according to claim 10 wherein said readout means includes a digital display means for converting digital electrical information signals into intelligible signals corresponding to integers forming the specific values being determined, and the system further comprises:

timer means for generating digital electrical signals reflective of the duration of a period of time; and data selection means for selecting the specific digital electrical information signals to be transmitted to said readout means, said data selection means including a first channel having a set of cooperating gates for receiving digital signals from said anaog-to-digital converting means, a second channel having a set of cooperating gates for receiving digital signals directly from said timer means; and channel selection means for determining which of said channels is to transmit signals to said display means.

14. The invention according to claim 13 wherein the sets of gates of the respective channels are AND gates having first and second voltage input lines, the first of said input lines carrying the respective digital signals and the second of said input lines alternatively carrying voltage signals for activating the sets of AND gates of one of said channels to transmit signals to said display means; and said selection means comprising means for selectively impressing on said second input lines the voltage signal required to activate the AND gates of the selected channel.

15. A system for providing information to a scuba diver relating to his movement through a body of water, said system comprising:

an electrical power source;

a pressure transducer connected to said power source for generating voltage signals reflctive of the ambient pressure of the system;

a first amplifier electrically connected to said pressure transducer for receiving the voltage signals generated by said pressure transducer and for generating amplified voltage signals corresponding to the voltage signals generated by said pressure transducer;

a timing oscillator for generating uniform electrical pulses at a regular frequency, each pulse being defined by a positive and a negative going edge;

a first monostable multivibrator electrically connected to said timing oscillator for generating a first timing pulse in response to each positive going edge of the pulses generated by said timing oscillator;

a second monostable multivibrator electrically connected to said timing oscillation for generating a second timing pulse in response to each negative going edge of the pulses generated by said timing oscillator;

a first sample and hold device electrically connected to said first monostable multivibrator and to said first amplifier, for storing the voltage signal generated by said first amplifier and for transmitting the previously stored voltage signal received from said first amplifier, in response to said first timing pulse;

a second sample and hold device electrically connected to said second monostable multivibrator and to said first amplifier, for storing the voltage signal generated by said first amplifier and for transmitting the previously stored voltage signal received from said first amplifier, in response to said second timing pulse;

a differential amplifier electrically connected to said first and second sample and hold devices for generating a voltage signal corresponding to the difference in amplitude between the last previous voltage signals transmitted by said first and second sample and hold devices, said differential amplifier including:

a second amplifier electrically connected to said first sample and hold device for receiving and amplifying voltage signals transmitted by said first sample and hold device; and a third amplifier electrically connected to said second sample and hold device and to said second amplifier for receiving from said second amplifier the amplified voltage signal corresponding to the last previous voltage signal generated by said first sample and hold device and voltage signals transmitted by said second sample and hold device;

an electrical connector for transmitting voltage signals from said aid differential amplifier;

a reference voltage source for generating a reference voltage signal having a value reflective of a predetermined safe rate of ascent;

an excess rate comparator electrically connected to said electrical connector and to said reference voltage source for generating a warning voltage signal when the rate of ascent of the system exceeds a predetermined safe rate of ascent, said excess rate comparator having a first inlet for receiving voltage signals generated by said differential amplifier and a second inlet for receiving said reference voltage signal, said excess rate comparator generating said warning voltage signal when the voltage signal received from said differential amplifier exceeds the reference voltage signal;

a normally open switch in said electrical connector, said switch being electrically connected to said timing oscillator for closing said electrical connector in response to the generation of said pulses by said timing oscillator;

a third monostable multivibrator electrically connected to said excess rate comparator for generating a voltage signal in response to the generation of a voltage signal by said excess rate comparator; and a light emitting diode for lighting to emit an intelligible alarm signal in response to the generation of a voltage signal by said third monostable multivibrator.

16. The invention according to claim 15 and further comprising:

an ascent comparator having a positive inlet electrically connected to said electrical connector and a negative inlet connected to ground, said ascent comparator generating a voltage signal when the voltage signal generated by said differential amplifier is positive indicating the system is ascending;

a fourth monostable multivibrator electrically connected to said ascent comparator for generating a voltage signal in response to the generation of a voltage signal by said ascent comparator; and a light emitting diode for lighting to emit an intelligible signal in response to the generation of a voltage signal by said fourth monostable multivibrator.

17. The invention according to claim 15 and further comprising:

a descent comparator having a negative inlet electrically connected to said electrical connector and a positive inlet connected to ground, said descent comparator generating a voltage signal when the voltage signal generated by said differential amplifier is negative indicating the system is descending;

a fifth monostable multivibrator electrically connected to said descent comparator for generating a voltage signal in response to the generation of a voltage signal by said descent comparator; and a light emitting diode for lighting to emit an intelligible signal in response to the generation of a voltage signal by said fifth monostable multivibrator.

18. A system for providing information to a scuba diver relating to water in which he is submerged, said system comprising:

an electrical power source;

a pressure transducer connected to said electrical power source for generating analog voltage signals reflective of the ambient pressure and depth of the system;

a first amplifier electrically connected to said pressure transducer for receiving the voltage signal generated by said pressure transducer and for generating amplified voltage signals corresponding to the voltage signals generated by said pressure transducer;

a temperature transducer for generating analog voltage signals reflective of the ambient temperature;

a second amplifier electrically connected to said temperature transducer for receiving the voltage signal generated by said temperature transducer and for generating amplified voltage signals corresponding to the voltage signals generated by said temperature transducer;

a data selector for selectively transmitting digital signals corresponding either to the depth of the system, the ambient temperature or the down time of the system, said data selector having a first channel for receiving and transmitting voltage signals corresponding to the depth of the system or the ambient temperature, and a second channel for receiving and transmitting voltage signals corresponding to the down time of the system;

a channel selector for selectively activating one of the first and second channels of said data selector, said channel selector including:

a comparator electrically connected to one channel of said data selector and connectable to said first and second amplifiers, and having a positive inlet port for receiving voltage signals from said first amplifier or said second amplifier, said comparator generating a first channel selection voltage signal in response to the generation of voltage signals by said first or second amplifiers when said comparator is connected to the respective one of said amplifiers to activate said one channel of said data selector; and a level invertor electrically connected to said comparator and to the other of said channels for generating a second channel selection voltage signal in response to the non-transmission of voltage signals from said first or second amplifiers to said comparator, to activate said other channel of said data selector;

a select switch of selectively electrically connecting said channel selector to said first amplifier or said second amplifier or to neither amplifier;

an analog-to-digital convertor electrically connected to said select switch for converting analog voltage signals to digital voltage signals and for transmitting the digital signals to aid data selector, said analog-to-digital convertor including:

an integrating amplifier having an inlet line electrically connected to said select switch, and an outlet line;

a capacitor connected across said integrating amplifier for charging to the voltage on said integrating amplifier;
an electrically actuable, normally open switch connected across said capacitor;
a second reference voltage source for generating a second reference voltage;
a second comparator electrically connected between the outlet line of said integrating amplifier and said electrically actuable switch and further connected to said second voltage source, said second comparator generating a voltage signal in response to the generation by said integrating amplifier of a voltage whose amplitude exceeds the amplitude of said second reference voltage, and said electrically actuable switch closing in response to the generation of the voltage signal by said second comparator to effect the immediate discharge of said integrating amplifier and said capacitor, to thereby effect the formation of an electrical pulse; and
first pulse counting means having inlets electrically connected to said integrating amplifier and to said timing oscillator for counting the numbers of pulses transmitted by said integrating amplifier at regular intervals established by said timing oscillator, and an outlet electrically connected to the first channel of said data selector;
a timing oscillator for generating electrical pulses at a uniform frequency;
second pulse counting means electrically connected to said timing oscillator for generating a digital timing signal in response to the generation of predetermined numbers of pulses by said timing oscillator to determine the down time of the system, said second pulse counting means including means for resetting said second pulse counting means for each new dive, said second pulse counting means having an outlet electrically connected to the second channel of said data selector; and
a readout device electrically connected to said data selector for displaying in digital form integers corresponding to the digital signals transmitted by the activated one of said first and second channels of said data selector.

* * * * *